United States Patent [19]

Aderhold et al.

[11] Patent Number: 4,894,093

[45] Date of Patent: Jan. 16, 1990

[54] PROCESS FOR PRODUCING BARIUM SULFATE WITH REACTIVE SURFACE

[75] Inventors: Clemens Aderhold, Krefeld; Hans-Joachim Röhrborn, Neukirchen-Vluyn, both of Fed. Rep. of Germany

[73] Assignee: Metallgesellschaft Aktiengesellschaft, Frankfurt am Main, Fed. Rep. of Germany

[21] Appl. No.: 199,982

[22] Filed: May 27, 1988

[30] Foreign Application Priority Data

May 30, 1987 [DE] Fed. Rep. of Germany ....... 3718277

[51] Int. Cl.$^4$ .......................... C01F 5/42; C01F 11/46; C08K 3/24
[52] U.S. Cl. .................................... 106/461; 106/471; 423/544
[58] Field of Search ................. 423/554; 106/461, 471

[56] References Cited

U.S. PATENT DOCUMENTS

| | | | |
|---|---|---|---|
| 1,398,468 | 11/1921 | Schumacher | 423/554 |
| 2,013,401 | 9/1935 | Booth | 106/461 |
| 2,156,727 | 5/1939 | Korinth | 106/461 |
| 2,509,585 | 5/1950 | Brown | 425/554 |
| 4,272,296 | 6/1981 | Balducci et al. | 106/461 |

FOREIGN PATENT DOCUMENTS

| | | | |
|---|---|---|---|
| 3203479 | 8/1983 | Fed. Rep. of Germany | 423/554 |
| 43-7005 | 3/1968 | Japan | 423/554 |
| 55-42233 | 3/1980 | Japan | 106/554 |
| 58-79813 | 5/1983 | Japan | 423/554 |
| 389022 | 11/1973 | U.S.S.R. | 423/554 |
| 2069990 | 9/1981 | United Kingdom | 423/554 |

*Primary Examiner*—Gary P. Straub
*Attorney, Agent, or Firm*—Herbert Dubno

[57] ABSTRACT

Barium sulfate which has a chemically reactive surface is produced by a precipitation of barium ions by means of sulfate ions in an aqueous medium. In order to provide barium sulfate as a filler having functional properties, the precipitation is effected as a coprecipitation in the presence of additional anions of water-soluble compounds, which anions are coprecipitable with barium ions to form difficulty soluble barium compounds. The reactive product which contains heteroatoms is subjected to an aftertreatment which is suitable for the use that is intended in a given case.

8 Claims, No Drawings

PROCESS FOR PRODUCING BARIUM SULFATE WITH REACTIVE SURFACE

FIELD OF THE INVENTION

Our present invention relates to a process for producing precipitated barium sulfate which has a chemically reactive surface.

BACKGROUND OF THE INVENTION

Precipitated barium sulfate is a known pigment, which can be used as a filler in the rubber industry, as an opacifier in art printing and photographic papers and in the plastic industry, and as a brightening agent and a fiber-dulling agent in the textile industry.

Barium sulfate is produced in known manner from water-soluble barium salts and water-soluble sulfates by a wet chemical precipitating process. These conventional precipitating processes involve a more or less time-consuming crystallization from isothermally supersaturated solutions.

Owing to the very low solubility of the precipitates the crystals are very small and the conversion almost always amounts to about 100%. The optimum properties of pigments and extenders from the aspect of application technology will be achieved with certain particle size distributions. For this reason it is by no means sufficient to form the desired barium sulfate precipitate in a prescribed chemical composition but the wet chemical process must be controlled to result in the desired primary particle size.

Precipitated barium sulfate is used as an inert pigment in numerous fields. Known fields of application include the use of the precipitated barium sulfate as a filler in the dyestuff and paint industry, in the plastic and rubber industries, or the use as a dulling agent in the production of fibers.

In these fields the barium sulfate is substantially used as an inert white filler based upon the fact that it is substantially inert chemically and physically.

In other applications, the "filler" is required to have functional properties in order to impart certain property profile to the system in which the filler is used. This is generally accomplished with so-called active fillers, such as silicates, oxides, carbon black, sulfur, which may be of natural, mineral origin or may be synthetically produced.

All so-called active fillers are characterized by having a surface reactivity owing to the presence of esterifiable hydroxyl groups, reducible carbonyl or carboxyl groups or radical-splittable molecules (e.g. polysulfides).

Barium sulfate lacks such a surface activity. In the $(SO_4)^{2-}$ tetrahedron, the central atom has its highest oxidation number. The high charge density of the $Ba^{2+}$ ions ensures a saturation of the bond sites on the crystal surface by the $Ba^{2+}$ ions.

A known measure of providing surface reactivity consisting of an aftertreatment with inorganic and/or organic adjuvants, such as a silanization, will not produce the desired results with barium sulfates because, by contrast with other oxide pigments, such as $TiO_2$, $ZnO$ and $SiO_2$, and by contrast also with carbon a particle of $BaSO_4$ has no surface centers which can be esterified and/or complexed and the aftertreating agents cannot be fixed with formation of a covalent bond.

A strictly physical-mechanical application, such as the application of additional components by a simple admixing, will not produce the desired result. When coated barium sulfate is incorporated in a polymer system, the aftertreating agent bonded by physical sorption will be detached from the surface. In order to prevent a subsequent detaching, the aftertreating agent must be chemically fixed to the $BaSO_4$ surface by a covalent bond or must be electrostatically fixed to said surface.

Published German Application No. 28 50 609 discloses stable filler-polyol dispersions in which the filler consists of a coprecipitate of barium sulfate and silica. The coprecipitate has an average particle size of 70 μm.

The phosphate-containing pigments known from Published German Application No. 17 17 096 are produced by coprecipitation in that sulfate ions and hydrogen phosphate ions are added to a solution which contains barium ions. The precipitation is effected at temperatures from 0° to 100° C.

Published German Application No. 33 47 191 discloses a process of producing a surface-treated barium sulfate which has an improved dispersibility in resin compositions. In that known process an aqueous solution of an alkali silicate is added to an aqueous suspension of barium sulfate, which suspension contains a surplus of barium ions. As a result, barium silicate is precipitated on the surface of the barium sulfate. This is succeeded by a treatment with mineral acid for decomposing the barium silicate to form a water-containing or hydrated silica. The product may subsequently be treated with a silane coupling agent.

OBJECT OF THE INVENTION

It is an object of the invention to provide an improved process for the production of precipitated chemically reactive barium sulfate in which the barium sulfate has a reactive surface.

DESCRIPTION OF THE INVENTION

This object is attained in a process in which barium ions are precipitated by means of sulfate ions in an aqueous medium, according to the invention, in a coprecipitation effected in the presence of additional anions of water-soluble compounds, which anions are coprecipitable with barium ions to form difficulty soluble barium compounds.

It has been found that the precipitation of barium sulfate in the presence of anions which form difficulty soluble compounds with barium ions will result in a product in which, in dependence on concentration, the heteroatoms are either present in a homogeneous distribution throughout the crystal or enriched on the surface.

In independence on the charge density and the molecular size of the anion and doping components, vacancies in the $BaSo_4$ crystal lattice will be occupied or lattice sites will be occupied in a random distribution or the surface charge will be shielded by long apolar molecular residues (hydrophobization).

In the process in accordance with the invention, anions of organic or inorganic water-soluble compounds may be used. In some cases it may be desirable to use mixtures of such compounds.

In the process in accordance with the invention the additional anions are desirably added to the aqueous solution which contains the inorganic sulfate component, such as an alkali sulfate. The additional component is used in an amount from 0.1 to 50% by weight based on the barium sulfate to be precipitated. The additional component is preferably used in an amount from 1 to 10% by weight.

Suitable organic water-soluble compounds for use in the process in accordance with the invention are organic compounds of the group alkyl and aryl sulfonates, alkyl and aryl sulfates or alkyl- and arylphosphoric acid esters, wherein the alkyl or aryl residue is optionally substituted in part by functional groups, or alkyl and aryl sulfonates are used. For instance, compounds used in the process in accordance with the invention may include:

Sodium dodecylbenzene sulfonate;
sodium lauryl sulfate;
sodium cetyl sulfate;
phosphoric acid monomethyl-monobenzyl ester;
lithium perfluorooctane sulfonate.

Suitable compounds which carry alkyl or aryl residues substituted with functional groups include such compounds with halogen, hydroxyl, amino, imino or mercapto groups or with a terminal double bond, such as 12-bromo-1-dodecanosulfonic acid;
sodium-10-hydroxy-1-decanesulfonate;
sodium carragenan;
sodium-10-mercapto-1-cetane sulfonate;
sodium-16-cetane(1) sulfate.

In general, the terms "alkyl" and "aryl" as used can refer to compounds containing 1 to 24 carbon atoms.

The anions used in the process in accordance with the invention of producing chemically reactive barium sulfate as anions of water soluble inorganic compounds (inorganic compounds other than sulfates) include inorganic compounds of the group thiosulfate, silicate, fluoride, fluorosilicate, monofluorophosphate or tungstenate.

Suitable compounds are e.g.:
Sodium thiosulfate ($Na_2S_2O_3$; 5 $H_2O$);
sodium silicate ($Na_2SiO_3$);
sodium fluoride (NaF);
lithium hexafluorosilicate ($Li_2(SiF_6)$; 2 $H_2O$);
sodium fluorophosphate ($Na_2PO_3F$);
sodium polytungstenate (3 $Na_2 WO_4$; 9 $WO_3$; $H_2O$).

The chemically reactive barium sulfate pigments produced by the process in accordance with the invention may be aftertreated in a manner which is suitable in view of the intended use.

For instance, if the barium sulfate surface has been provided with acid or esterifiable hydroxyl groups, such as —Si—OH, O=P—OH or —Ti—OH owing to the use of the doping components or if the crystal surface contains $(SO_4)^{2-}$ anions as well as other chemically reactive groups formed by the coprecipitation, such as $S^{2-}$, $SH^-$ or $F^-$, that pigment may be provided with after treating components and/or coupling agents which are suitable for the intended field of use.

A coupling agent which is generally employed may consist of an organofunctional alkoxysilane, such as vinyl trimethoxysilane. Alkoxytitanates, alkoxyzirconates or alkoxyaluminates may also be used. The coupling agent is applied in a manner known per se. It may be dissolved in a solvent and the solution may be applied to the pigment, whereafter the solvent is evaporated and the solids are dried. Liquid coupling agents may be sprayed onto the pigment powder as it is agitated in a mixing bed.

The chemically reactive barium sulfate pigment which has been produced by the process in accordance with the invention is provided with a defined functionality which is capable of effecting a covalent interaction between the pigment or the solid particles the polymer matrix of a reactive resin, such as polyolefins. If the chemically reactive barium sulfate produced by the process in accordance with the invention is incorporated in an organic polymer or another organic system, defined mechanical, optical and thermal solid properties which are characteristic of a composite will be imparted to said polymer or system.

For this reason the invention relates also to the use of a barium sulfate, which has been produced by the process in accordance with the invention and has a chemically reactive surface, as a finely dispersed active solid component in natural or synthetic elastomers, thermoplastic and thermosetting plastics and ceramic compositions.

For instance, the coefficient of expansion of polymers is higher by powers of ten than that of inorganic solids, as a rule. In dependence on the interaction between the pigment and the polymer matrix the coefficient of expansion of the composite may be close to that of the pure polymer (no adhesion). This result will be independent of the concentration.

Alternatively, the dilatation of the composite may decrease to the value for a solid (strong bond) as the filler content increases. Analogous remarks are applicable to the modulus of elasticity. In dependence on particle size and on the morphology of a chemically active pigment, it is possible to provide opaque or transparent polymer systems, such as coatings or composites, and this will not adversely affect the bonding of the polymer even under mechanical stress (stretching).

The advantages of the process in accordance with the invention are seen in that chemically reactive precipitated barium sulfate can be produced in a simple and economical procedure. The surface reactivity is controlled with a view to the intended use of the barium sulfate pigment and may range from a virtually chemically inert (untreated) surface to a complete occupation of the surface of the $BaSO_4$ pigment by reactive centers.

SPECIFIC EXAMPLES

The invention will be explained in greater detail with reference to the following Examples.

EXAMPLE 1

In a precipitating cell a $BaCl_2$ solution was reacted with stirring with an $NaSO_4$ solution which contained 2.5 g dissolved Na lauryl sulfate ($C_{12}H_{25}OSO_3Na$). The throughput rates amounted to 325 ml/min $BaCl_2$ solution having a density of 1.050 g/ml and 110 ml/min $Na_2SO_4$ solution having a density of 1.104 g/ml. The precipitated $BaSO_4$ was filtered off, repeatedly washed with water until the suspension had a conductivity of 100 µS/cm, and then dried at 110° C. The carbon content of the dry product was determined to amount to 0.32%.

The product can be dispersed in varnishes and plastics with results which are distinctly superior to those obtained with a pure barium sulfate having a comparable particle size. To test the dispersed state of the material produced in accordance with the invention, the ratio of the contrasts achieved in a transparent varnish over black and white backgrounds was determined.

Varnish mixtures containing a fatty acid-modified alkyl resin (Alftalat AC 451 of Hoechst AG) and a melamine resin (Luwipal 012 of BASF AG) as well as a filler in a concentration of 4.4% by volume were dispersed for three hours under identical conditions. Thereafter the ground pastes had grindometer values (in accordance with German Industrial Standard DIN 53 203) below 7 μm. The ratio of the contrasts of the varnish coats (wet layers having thicknesses of 100 μm and 20 μm, respectively) on transparent backing films over black and white aluminum plates was determined. The varnish coats on the black-and-white contrasts plates (wet layer having a thickness of 200 μm) were directly measured. The contrast ratio CR is defined as $$CR = \frac{\text{reflectance through } Y \text{ filter over black background}}{\text{reflectance through } Y \text{ filter over white background}} \times 100$$

The transmission of the hydrophobized product obtained in Example 1 is distinctly superior to that of a pure precipitated barium sulfate having a comparable BET surface area (Table 1).

TABLE 1

| Pigment | BET surface area $m^2/g$ | Pigment concentration % by vol. | CR (100 μm foil) | CR (200 μm carton) |
|---|---|---|---|---|
| None | — | — | 3.22 | 0.92 |
| Blancfixe F | 3.2 | 4.4 | 15.57 | 2.74 |
| Example 1 | 3.6 | 4.4 | 9.03 | 1.61 |

EXAMPLE 2

In a precipitating cell a $BaCl_2$ solution and a $Na_2SO_4$ solution were reacted with stirring. The $Na_2SO_4$ solution had a density of 1.088 g/ml and had been made alkaline by an addition of 7 g NaOH per liter of $Na_2SO_4$ solution. 12 g $Na_2SiO_3$ solution (density 1.346 g/ml) per liter of the sulfate solution were added to the latter. The throughput rates amounted to 105.7 ml/min $BaCl_2$ solution having a density of 1.073 g/ml and 896 ml/min $Na_2SO_4$ solution. The precipitate was filtered off, repeatedly washed with water and dried at 110° C. The wet chemical analysis of the dry product indicated an $SiO_2$ content of 0.62%.

The incorporation of that product in polypropylene and polyamide, respectively, resulted in composites having a much higher strength than composites containing unmodified barium sulfate. Pigments having a comparable particle size (BET surface areas of 18.3 and 19 $m^2/g$, respectively) were admixed to polyamide 6 (Ultramid$^{(R)}$BS 700 of BASF AG) in a concentration of 1% by weight and were directly injection-molded to form dumbbell-shaped test specimens for the tensile test in accordance with DIN 53 455.

Corresponding test specimens were made from polypropylene (Hostalen$^{(R)}$PPK 1060 F of Hoechst AG) after a batch of 40% by weight had been extruded and injection-molded without a dilution. The improvement of the mechanical properties of polyamides are significant, particularly in view of the low pigment concentrations.

TABLE 2

Results of Tests for Mechanical Properties

| Composite | Pigment | Ultimate tensile strength $N/mm^2$ | ± | Tensile strength at break $N/mm^2$ | ± | Modulus in tension $N/mm^2$ | ± |
|---|---|---|---|---|---|---|---|
| 100% PPK | — | 32.5 | 0.6 | 16.6 | 0.5 | 177 | 24.6 |
| 60% PPK | 40% $BaSO_4$ untreated | 24.2 | 0.2 | 23.9 | 0.4 | 763 | 26.0 |
| 60% PPK | 40% Example 2 | 29.3 | 0.2 | 28.4 | 0.5 | 875 | 33.9 |
| 100% PA6 | — | 61.0 | 0.7 | 40.3 | 1.9 | 1,034 | 53 |
| 99% PA6 | 1% $BASO_4$ untreated | 57.6 | 1.6 | 40.6 | 4.1 | 1,020 | 29 |
| 99% PA6 | 1% Example 2 | 66.5 | 1.0 | 63.0 | 2.6 | 1,239 | 46 |

Even if the filler content is high, as in the PPK, the modified barium sulfate will reduce the tensile strength only slightly (relative to unfilled PPK) but will distinctly increase the tensile strength at break and the stiffening action.

EXAMPLE 3

In a precipitating apparatus, $Na_2SO_4$ and $BaCl_2$ in a mole ratio of 1:0.97 were reacted as aqueous solutions with stirring. The $Na_2SO_4$ solution had a density of 1.104 g/ml and contained 1.35 g dissolved $Li_2SiF_6 \cdot 2 H_2O$ per liter. The white product was separated from the mother liquor and was repeatedly washed with cold water until a 10% suspension had an electrical conductivity of 280 μS/cm. After drying at 115° C. the powdered barium sulfate was found to contain 0.42% $SiF_6$ The product of Example 3 can be incorporated in a reactive resin to increase the bond strength of a joint between metals and to distinctly improve the adhesion of the adhesive on the parts which have been joined.

The modified $BaSO_4$ and an untreated barium sulfate, both having an average particle size of 0.22 μm, were dispersed in the epoxide resin (Beckopox$^{(R)}$ EP 128 of Heochst AG) to a grindometer fineness (in accordance with DIN 53 203) below 5 μm. The filler content of the adhesive system which contained a hardener (Beckopox$^{(R)}$-Spezialhärter EM 654 of Hoechst AG) amounted to 15% by weight in each case. The strength of joints between metal parts was tested generally in accordance with DIN 53 283 and DIN 53 282 but the test sheets consisted of 99.5% pure aluminum.

TABLE 3

Test Results with the System EP 128/EH 654 (100:50)

| Pigment | Filler content | Bond strength $N/mm^2$ | Peel strength $N/mm^2$ | Initial-separation peel strength $N/mm^2$ |
|---|---|---|---|---|
| — | — | 9.60 | 0.40 | 2.26 |
| $BaSO_4$ untreated | 15% | 9.30 | 0.46 | 2.31 |
| Example 3 | 15% | 15.87 | 0.82 | 3.94 |
| Barite | 40% | 9.73 | 0.30 | 1.99 |

After the tensile shear test, the fractured sheets bonded with an adhesive containing the modified BaSO$_4$ as a pigment had a higher bond strength and a higher peel strength (Table 3) and after the tensile shear test were found to exhibit only pure cohesion fractures. This means that the joint had failed in the polymer layer rather than by a delamination of the adhesive layer from the metal substrate, as is the case in 80% of the tensile shear tests and angle peeling tests of specimens in which untreated BaSO$_4$ or baryte had been used as finely dispersed solids.

EXAMPLE 4

The barium sulfate which had been modified with silicate in accordance with Example 2 was used to prepare in dry isopropanol a dispersion which contained 10% by weight solids. A 1% solution of vinyl trimethoxysilane in dry isopropanol was added in drops with stirring. The resulting mixture finally contained the silane in an amount of 1% by weight of the pigment. The suspension was subsequently stirred at about 40° C. for about one hour and was then filtered. The unconsumed silane, which was bonded by physical sorption, was subsequently washed out of the solids with dry isopropanol and the solids were then dried. The resulting pigment was found to contain the vinyl grouping by IR spectroscopy.

It is known that coupling agents which contain vinyl groups are effective in mixtures of rubber and mineral fillers to promote the cross-linking with sulfur and peroxide (Published German Application No. 26 35 601). Even if a suitable unsaturated coupling agent is used, the use of untreated barium sulfate will result in a considerable deterioration of the properties of rubber mixtures from the aspect of application technology because no bonding groups for a chemical reaction are available on the surface of the solids. But if the free surface of the pigment is doped with esterifiable silanol groups, in accordance with the invention, as is taught in Example 2, known coupling components will be bonded, as has been shown in Example 4. From the aspect of application technology, the modified BaSO$_4$ is superior to silicate fillers, such as silica, kaolin, Al$_2$O$_3$ and AlO(OH) etc., in that the bonding sited on the originally inert pigment can be controlled in a defined manner. By a suitable control of the particle size and of the concentration of the doping component it was possible to provide about 5 to 20 silanol groups per pigment particle in the product of Example 2. The aftertreated product of Example 4 exhibits the expected increase of the crosslink density in mixtures which had been vulcanized with sulfur and peroxide. More specifically, a rubber mixture containing a butadiene-acrylonitrile (27%) polymer and 60 parts by weight of the product of Example 4 per 100 parts by weight of polymer had the same properties in respect of tensile strength, elongation and break and stress at 100% elongation as a mixture which contained kaolin that had been aftertreated analogously and the hardness was comparable (59±5 Shore A).

EXAMPLE 5

A precipitate suspension which had been prepared in accordance with Example 1 and contained 250 g (hydrophobized) BaSO$_4$ was repeatedly washed with water until a conductivity of 100 μS/cm had been obtained, and was subsequently filtered. The filter cake contained 60% solids and was slurried and washed with 1.5 l portions of isopropanol four times. The isopropanol paste was filtered off, slurried with 1.5 l xylene, stirred at room temperature for 10 minutes, and filtered. After washing four times with 0.5 l portions xylene, no alcohol bonds were detected in the IR spectrum of the last filtrate. The end product consisted of a tough waxlike paste, which contained about 45% solids and could be admixed to organic binder systems without further dispersing work.

From the aspect of application technology, the influence was determined of the product of Example 5 on the formation of sediment in a white stoving enamel which contained alkyd and melamine resins and Hombitan® R 510 (available from Sachtleben) as a white TiO$_2$ pigment. In the sedimentation test the height of the sediment and its consistency were determined and rated between 1 and 9 corresponding to a formation of a very small amount of sediment to a formation of a very large amount of sediment. The basic formula containing no barium sulfate pigment was awarded a rating of 3. When 2% by weight of the white pigment R 510 had been replaced by untreated barium sulfate, the sedimentation rating of the system deteriorated to 7. A corresponding replacement by the product of Example 5 resulted in the sedimentation rating 2. The paint coat containing the product of Example 5 exhibited a very high gloss retention.

We claim:

1. A process for producing a barium sulfate pigment having a chemically reactive halogen, hydroxyl, amino, imino, mercapto or terminal olefinic functional group bonded to its surface, said functional group capable of effecting a covalent interaction between said pigment and an organic resin, which comprises the steps of:
    (a) coprecipitating barium sulfate and a poorly soluble barium salt of an additional anion by providing barium ions in the presence of sulfate ions in an aqueous medium containing said additional anion in the form of a water-soluble organic salt or compound selected form the group consisting of alkali metal alkyl or aryl sulfonates, alkali metal alkyl or aryl sulfates, and alkyl or aryl phosphoric acid esters, wherein said alkyl or aryl groups are unsubstituted or substituted by halogen, hydroxyl, amino, imino or mercapto, or contain a terminal olefinic functional group, said additional anion being corprecipitable with barium ions to form said poorly water-soluble barium salt;
    (b) recovering the resulting corpreciate from the aqueous medium; and
    (c) drying the coprecipitate and afterwards treating the corprecipitate with a silane or siloxane.

2. The process defined in claim 1 wherein additional anion is used in an amount from 0.1 to 50% by weight of the barium sulfate preciptated.

3. The process defined in claim 2 wherein said amount is 1 to 10% by weight of the barium sulfate precipitated.

4. A barium sulfate having a chemically reactive surface as produced by the process of claim 11 finely dispersed as a filler or pigment in a composition selected from the group consisting or natural or synthetic elastomers, thermoplastic or thermosetting plastics and ceramic materials.

5. A process for producing a barium sulfate pigment having a chemically reactive thiosulfate, silicate, fluoride, fluorosilicate, monofluorophosphate, or tungstentate functional group bonded to its surface, said functional group capable of effecting a covalent interaction between the pigment and an organic resin, which comprises the steps of:
  (a) coprecipitating barium sulfate and a poorly water-soluble barium salt of an additional anion by providing barium anions in the presence of sulfate ions in an aqueous medium containing said additional anion in the from of a water-soluble inorganic salt selected from the group consisting of an alkali metal silicate, alkali metal fluoride, alkali metal fluorosilicate, alkali metal monofluorophosphate and alkali metal tungstenate, said additional anion being coprecipitable with barium ions to form said poorly water-soluble barium salt;
  (b) recovering the resulting corprecipitate from the aqueous medium; and
  (c) drying the coprecipitate and afterwards treating the coprecipitate with a silane or siloxane.

6. The process defined in claim 5 wherein the additional anion is used in an amount from 0.1 to 50% by weight of the barium sulfate precipitated.

7. The process defined in claim 6 wherein said amount is 1 to 10% by weight of the barium sulfate precipitated.

8. A barium sulfate having a chemically reactive surface as produced by the process of claim 5 finely dispersed as a filler or pigment in a composition selected from the group consisting of in natural or synthetic elastomers, thermoplastic or thermosetting plastics and ceramic materials.

* * * * *